Patented Nov. 21, 1922.

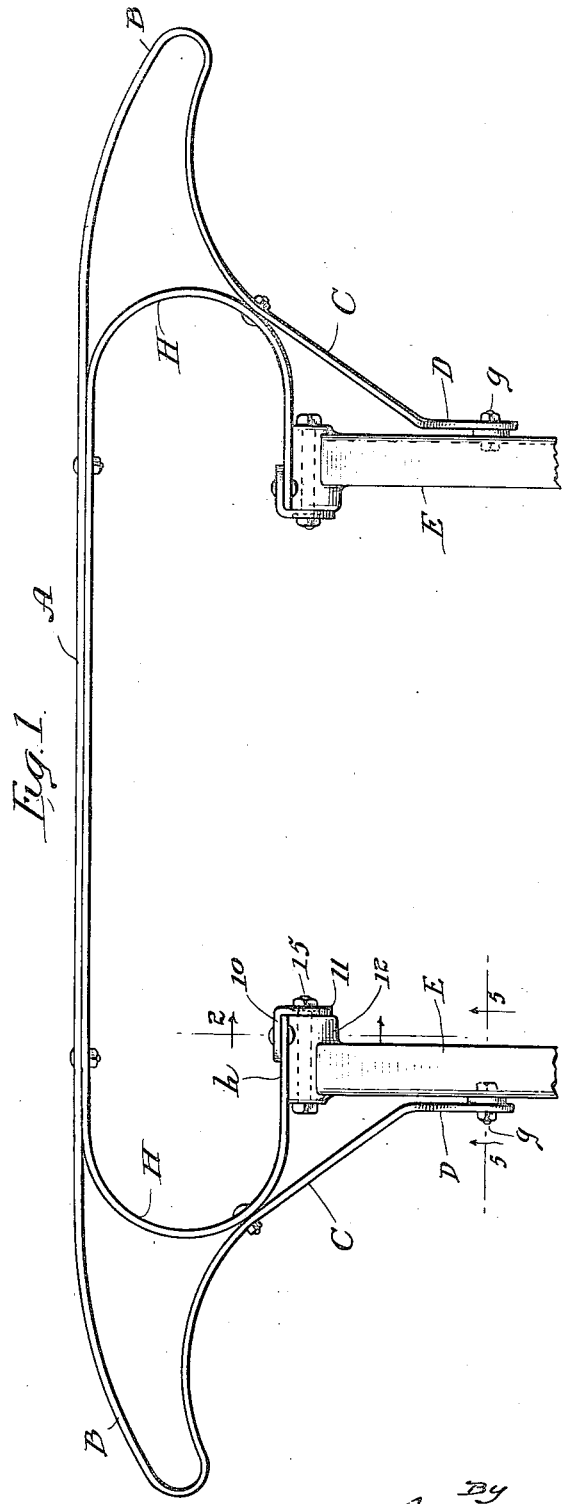

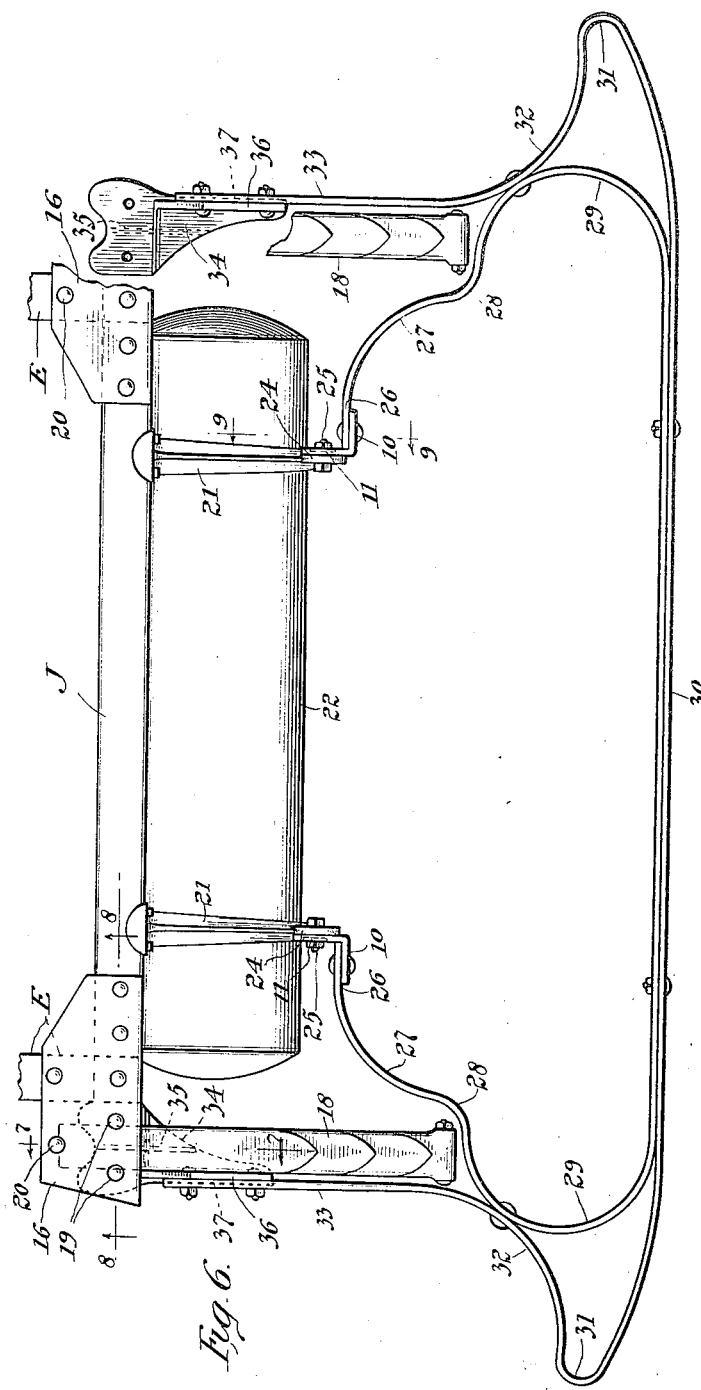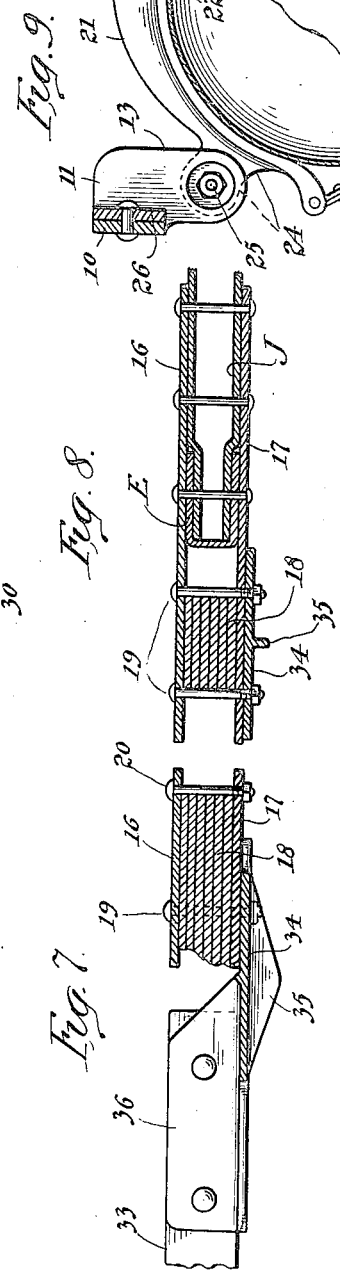

1,436,118

UNITED STATES PATENT OFFICE.

LEWIS F. STAFFORD, OF CHICAGO, ILLINOIS, ASSIGNOR TO STAFFORD SPRING GUARD CO., OF CHICAGO, ILLINOIS, A CORPORATION OF ILLINOIS.

BUMPER.

Application filed February 6, 1922. Serial No. 534,582.

*To all whom it may concern:*

Be it known that I, LEWIS F. STAFFORD, a citizen of the United States, residing at Chicago, in the county of Cook and State of Illinois, have invented a new and useful Improvement in Bumpers, of which the following is a specification.

My invention relates to bumpers for automobiles and means for attaching said structures to the vehicle. More particularly the invention has relation to bumpers for attachment to automobiles of the Dodge Brothers make, and the parts are so designed that they may be readily assembled with the standard construction of Dodge motor vehicles by persons having moderate mechanical skill and without the use of special tools or equipment.

One of the objects of my present invention resides in the provision of a bumper that may be securely and rigidly attached to the vehicle, preferably to the chassis portion thereof, so that no alterations need be made to the chassis or the bumper. Another object is the provision of suitable brackets or attaching means that will co-ordinate the bumper structure with the standard Dodge chassis so that the bumper structure may be quickly assembled therewith by utilizing certain readily accessible bolts and other instrumentalities usually found on such vehicles. I prefer to carry out my invention in substantially the manner hereinafter described, and as more particularly pointed out in the claims. Reference will now be made to the accompanying drawings, which are, in a sense, diagrammatic for the purpose of illustration.

In the drawings:

Figure 1 is a top plan of my bumper structure and attaching means showing the manner of assembly at the front or forward end of a Dodge chassis.

Figure 2 is a vertical section taken on line 2—2, Figure 1, slightly enlarged, and looking in the direction of the arrows.

Figure 3 is a view of the opposite side of the structure shown in Figure 2.

Figure 4 is a plan of the structure shown in Figures 2 and 3, a portion being broken away to better illustrate the same.

Figure 5 is a transverse vertical section through the horn of the chassis on line 5—5 Figure 1, and enlarged.

Figure 6 is a view similar to Fig. 1 showing a modified type of bumper structure and brackets in assembly with the rear end of the Dodge chassis.

Figure 7 is a vertical section on line 7—7, Figure 5, slightly enlarged and partly broken away.

Figure 8 is an enlarged vertical section on line 8—8 Figure 5, and

Figure 9 is a vertical section on line 9—9, Figure 5 and enlarged.

Referring to the drawings wherein the same parts are designated by the same reference characters throughout the different views, it will be seen the forward or front bumper comprises an impact element A having a hair-pin spring bend B at its opposite ends, which bends merge into obliquely disposed arms C extending inwardly toward the vehicle chassis and are at their ends terminated in straight portions D that extend parallel with and along side the chassis side sills E.

The arms just mentioned are secured to side sills E by giving the metal from which the bumper is fabricated an upwardly inclined edge bend F so as to aline the end portions of arm D along side the web of the channel side sills E, in the manner shown in Fig. 4. In the Dodge type of vehicle the web of the side sills is provided with a transverse opening or aperture G, known as the snubber bolt hole in the event the vehicle owner desires to mount a shock absorber, or like structure, upon his car. The arms of the main portion of my bumper are constructed to assemble with this snubber bolt hole G, and to do this, I provide an aperture *d* in the adjacent upturned portion of arm D that alines with the snubber bolt hole, and through both of which apertures a threaded bolt *g* is passed. If desired, a washer *e* may be interposed between the web of the sill and arm D of the bumper prior to or during the assembly of the structure.

The bumper structure heretofore described is reinforced by supplementary arms that are formed into substantially semi-circular bends H that are at their forward portions bolted or riveted or otherwise secured to impact member A. At their opposite ends the supplementary arms terminate in substantially straight portions *h*, while the intermediate portions of these bends, which approach and contact the oblique arms C of the main bumper are riveted or otherwise secured thereto. At the ends of portion $h$ I secured, by rivets or otherwise, an angular metal bracket, one of the members 10 thereof is riveted or otherwise secured to the end of bumper arm $h$ and the other member 11 thereof extends at right angles to member 10 toward the cylindrical embossment 12 usually upon the lower outer end of the horn of the chassis sill E. This lateral member 11 is provided with a downwardly projecting extension 13 that has a shouldered aperture 14 arranged to aline with bolt 15 that secures the upper forward end of the spring to the end of the chassis horn. In assembling the brackets with the chassis horn the nuts on spring bolts 15 are removed and the bolts assembled through apertures 14 after which the nuts are replaced and screwed onto the bolts into the recessed portions of the apertures, or, in lieu thereof, a shoulder or sleeve nut of the well known construction may be used.

At the rear end of the Dodge chassis, side-sills E are connected by a rear end sill J and irregularly shaped gusset plates 16 and 17 are secured, respectively, to the top and bottom faces of the sills at the corners of the chassis frame and project laterally or overhang the sides thereof in the manner shown in Figs. 6 and 8 of the drawings. The projecting or extended portions of these plates provide spring holders to receive the leaves 18 of the upper segment of the elliptical springs that are securely clamped between said gusset plates by a pair of vertical side bolts 19 passed through said plates outside the spring and a vertical end bolt 20 is passed through the plates back of the rear ends of the leaves. Bolted to and extended rearwardly from the end sill J is a pair of segmental shaped upwardly curved brackets 21 up against which the usual fuel tank 22 is clamped by suitable straps 23, and these brackets, adjacent their outer ends, are provided with lateral ears 24 that are apertured to receive bolts 25 whereby a spare tire rack or carrier (not illustrated) is mounted at the rear of the vehicle. The end portions 26 of the supplementary supporting arms of the bumper structure are connected to these ears 24 by the same form of angle L-shaped brackets as that employed at the front of the vehicle for the supplementary arms, the ends of the arms being riveted or bolted to members 10 and the depending extensions 13 of the brackets have bolts 25 of the tire rack passed therethrough and secured in place by the same nuts that were employed to clamp the bolts in place previous to the mounting of the bumper bracket.

From ends 26 the arms extend laterally and outwardly in quadrant bends 27 and are then given short reverse bends so that said arms extend around the location of the spare tire or tires as well as the ends of rear springs 18. Said supplementary supporting arms are continued in second bends 29 laterally and outwardly of semi-circular shape to impact member 30 of the rear bumper to which they are connected by clips, bolts, rivets, or the like. The outer ends of the impact member are bent hair-pin shape, as shown at 31 (Fig. 6), and from these bends the metal strap curves inwardly towards the vehicle in extended sweeps 32 an intermediate portion whereof contacts and is secured to bends 29 and then continues straight to provide elongated arms 33 that extend alongside springs 18 and terminate adjacent gusset plates 16 and 17. The end of each bumper arm 33 is connected to the chassis by means of an angular bracket that consists of a main or body plate 34 of substantially triangular shape that is horizontally disposed to fit against the lower gusset plate 17 and is tapered towards its outer end; said plate being reinforced upon its outer or lower surface by an outstanding rib 35 and is apertured at its wider end to receive the clamping or tie bolts 19. One longitudinal edge of plate 34 is preferably straight and has an upstanding flange 36 to which the adjacent portion of bumper arm 33 is bolted or otherwise secured, and this flange is so disposed that it lies alongside spring 18 and has a longitudinal horizontal lip 37 to provide shoulders against which the lower edge of arm 18 rests. A transverse rib or bead 38 is provided upon the upper surface of plate 34 and so located as to abut the adjacent edge of gusset plate 17 in order to position the bracket plate with respect to bolts 19. When arms 33 have been secured in place upon gusset plate 16 by bracket 34 and ends 26 of the supplementary supporting arms have been attached to ears 24 of the fuel tank brackets by the angular pieces 10—11 the structure will be mounted securely upon the chassis of the vehicle and liability to vibrate or rattle is practically eliminated.

What I claim is:

1. A bumper comprising an impact member extending transversely of the end of a vehicle and having a spring arm at each end that extends to and is attached to the vehicle, a supplementary supporting arm adjacent each end of said impact member and extended therefrom towards the vehicle in a spring loop, and angular brackets to which the ends of said supporting arms are secured, each bracket having an extension engaged with and secured to a member projecting from an adjacent portion of the vehicle.

2. A bumper comprising an impact member extending transversely of the end of a vehicle and having a spring arm at each end that extends to and is attached to the vehicle, a supplementary supporting arm adjacent each end of said impact member and extended therefrom towards the vehicle in a spring loop, and L-shaped angle brackets to which the ends of said supporting arms are secured; each bracket having a lateral extension engaged with and secured to a member extended outwardly from an adjacent portion of the vehicle.

3. A bumper comprising an impact member extending transversely of the end of a vehicle and having a spring arm at each end that extends to and is attached to the vehicle, a supplementary supporting arm adjacent each end of said impact member and extended therefrom towards the vehicle in a spring loop; said spring loops extending adjacent a portion of said bumper arms, means securing the adjacent portions of said bumper arms and spring loops to each other, and angular brackets to which the ends of said supporting arms are secured, each bracket having an extension engaged with and secured to a member projecting from an adjacent portion of the vehicle.

4. A bumper structure for vehicles comprising an impact member having lateral arms extended towards the vehicle, said vehicle having a transverse element to which the springs of the vehicle are secured and from which said springs project longitudinally of the vehicle, a plate secured to said transverse element, and an angular arm extending from said plate the vertical member thereof being disposed alongside said springs and to which the adjacent portions of the bumper arms are secured.

5. A bumper structure for vehicles comprising an impact member having lateral arms extended toward the vehicle; said vehicle having an element projecting outwardly therefrom and having the springs of the vehicle secured thereto, a plate secured to said projecting element, an arm projecting from said plate longitudinally of the springs, and a vertically disposed flange on said arm to which the bumper arm is secured; said flange lying adjacent the side of the springs, substantially as described.

6. The combination with the chassis of a vehicle having a member projecting laterally therefrom, of a bumper attaching bracket consisting of a plate secured in a horizontal plane to said member and formed with an arm extending horizontally therefrom and longitudinally of said chassis below the springs thereof, of a transverse rib upon the upper side of said plate arranged for abutment against the edge of the lateral member on said chassis, and a vertically disposed longitudinal flange upon one face of said arm to which said bumper is adapted to be attached.

7. The combination with the chassis of a vehicle having a member projecting therefrom, of a bumper attaching bracket consisting of a substantially L-shaped angular plate arranged with its flanges in vertical planes, one of said flanges adapted to receive an arm of the bumper, and a downwardly projecting extension on the other of said flanges adapted to be secured to the projecting member of the chassis.

8. The combination with the chassis of a vehicle having a member projecting laterally therefrom, of a bumper attaching bracket consisting of a plate secured in a horizontal plane to said member and projecting laterally therefrom, a reinforcing rib upon one face of said plate, and a bumper securing flange upon the opposite face of said plate and arranged in a plane parallel with and spaced from the plane of said rib.

9. A bumper bracket comprising a plate apertured for attachment to the vehicle, a horizontal extension one longitudinal edge whereof is substantially straight, a vertically disposed flange upon said substantially straight edge to which flange the bumper is secured, a reinforcing rib upon the opposite face of said plate and extension, and a shoulder formed adjacent the corner of said extension and flange against which the bumper rests.

Signed at Chicago, county of Cook and State of Illinois, this 10th day of December, 1921.

LEWIS F. STAFFORD.